United States Patent [19]

Newell

[11] 4,447,047

[45] May 8, 1984

[54] CYLINDER STRUCTURE

[75] Inventor: James M. Newell, Lowell, Mich.

[73] Assignee: Di-Dro Systems Inc., Dearborn, Mich.

[21] Appl. No.: 419,976

[22] Filed: Sep. 20, 1982

Related U.S. Application Data

[63] Continuation of Ser. No. 224,848, Jan. 14, 1981, abandoned.

[51] Int. Cl.$^3$ .............................................. F16F 9/02

[52] U.S. Cl. .................................. 267/118; 267/119; 267/127; 92/162 P; 92/168

[58] Field of Search ............... 267/64.11, 64.13, 64.15, 267/64.28, 113, 118, 119, 124, 127, 129, 130; 188/313, 314, 315, 316, 322.16, 322.18, 322.17, 322.21, 352, 317; 74/18.2; 91/416; 92/162 P, 162 R, 128, 159, 156, 85 B, 160, 168, 82, 143

[56] References Cited

U.S. PATENT DOCUMENTS

| | | | |
|---|---|---|---|
| 2,942,582 | 6/1960 | Dempster et al. | 92/168 |
| 3,011,845 | 12/1961 | Watt et al. | 92/168 |
| 3,232,180 | 2/1966 | Deschenes | 91/416 |
| 3,303,831 | 2/1967 | Sherman | 92/82 |
| 3,608,438 | 9/1971 | Thomas et al. | 92/163 |
| 3,923,294 | 12/1975 | Gold et al. | 267/119 |
| 3,947,005 | 3/1976 | Wallis | 267/119 |
| 4,006,666 | 2/1977 | Murray | 92/85 B |
| 4,043,254 | 8/1977 | Jaeger | 92/85 B |
| 4,056,965 | 11/1977 | Heiser | 267/119 |
| 4,076,103 | 2/1978 | Wallis | 267/119 |
| 4,145,959 | 3/1979 | Burden et al. | 92/143 |
| 4,342,448 | 8/1982 | Wallis | 267/119 |

FOREIGN PATENT DOCUMENTS

| | | | |
|---|---|---|---|
| 616266 | 7/1931 | Fed. Rep. of Germany | 267/119 |
| 22044 | of 1915 | United Kingdom | 188/322.18 |

*Primary Examiner*—Douglas C. Butler
*Assistant Examiner*—R. R. Diefendorf

[57] ABSTRACT

A cylinder structure and method for rapidly evacuating a cylinder without contamination thereof. The structure comprises a hollow cylinder, a piston mounted in the cylinder for axial reciprocation, a hollow piston rod secured to the piston for movement therewith extending out of one end of the cylinder, a seal between the one end of the cylinder and the piston rod, and a radial opening through the hollow piston rod between the piston and seal for evacuating the space between the cylinder, piston, piston rod and seal during reciprocation of the piston within the cylinder. The method includes the step of evacuating the space between the cylinder, piston, piston rod and seal through the piston rod during reciprocation of the piston within the cylinder.

6 Claims, 3 Drawing Figures

CYLINDER STRUCTURE

This is a Continuation of U.S. application Ser. No. 06/224,848 filed on Jan. 14, 1981, now abandoned.

BACKGROUND OF THE DISCLOSURE

1. Field of the Invention

The invention relates to piston and cylinder structures and the method of operation thereof, and refers more particularly to nitrogen cylinder structure including a hollowed out cylinder, a piston, and a hollowed out piston rod wherein there is provided a radial opening in the hollow piston rod adjacent the piston for evacuation of the space defined by the cylinder, piston, piston rod and sealing means between the cylinder and piston rod into the cylinder without contamination of the piston and cylinder structure to allow rapid, substantially trouble-free operation thereof, and the method of operation of the structure including the step of evacuating the space through the radial opening.

2. Description of the Prior Art

In the past, in piston and cylinder structures of the type wherein a hollowed out cylinder receives a piston for axial reciprocation therein having a piston rod secured thereto which extends out of one end of the cylinder and a seal is provided between the one end of the cylinder and the piston rod, the space defined between the cylinder, piston, piston rod and seal has been vented to ambient pressures generally through or around the seal between the cylinder and the piston rod or radially through the cylinder.

Such venting of this space is necessary to allow rapid reciprocation of the piston within the cylinder, since gases trapped in this area could restrict the movement of the piston and piston rod within the cylinder. Such venting has in the past lead to contamination of the piston and cylinder structure, causing rapid deterioration and inefficient operation of piston and cylinder structures.

Attempts to prevent contamination of such piston and cylinder structures in the past have taken the form of flexible accordion-type boots secured to the piston and positioned over at least a portion of the piston rod extending out of the cylinder. Also, annular collar-type structures for evacuating the area between the cylinder, piston, piston rod and seal through radial openings in the cylinder have sometimes been provided in the past connected to exhaust conduits or the like. Such structures are expensive in themselves to produce, must themselves be sealed, and are subject to damage and wear and are therefore undesirable.

SUMMARY OF THE INVENTION

In accordance with the structure of the invention, a radial opening has been provided in a hollow piston rod connected to a piston, adjacent the piston, whereby the space defined between a cylinder, piston, piston rod and seal is evacuated into the center of the cylinder. Accordingly, since there is no opening to the exterior of the cylinder and no venting exterior of the cylinder, no contamination of the piston and cylinder structure is possible. Further, since venting of the space is complete, no interference is present to impede the operation of the piston and cylinder structure. Also, some positive pressure is maintained in the space in accordance with the structure of the invention to restrict any possible contamination which might tend to enter the space through the seal.

The method of the invention includes the step of exhausting the space defined between the cylinder, piston, piston rod and seal radially through the piston rod into the cylinder.

DESCRIPTION OF THE PREFERRED EMBODIMENT

Figure 1:
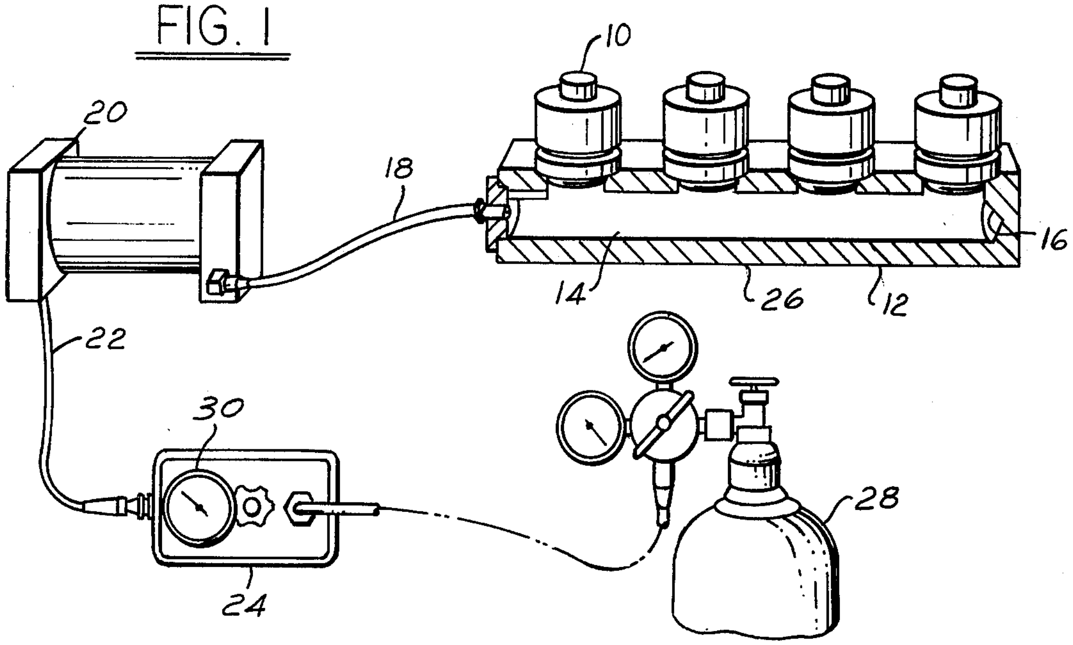
FIG. 1 is a diagrammatic representation of piston and cylinder structure constructed in accordance with the invention in a conventional nitrogen cylinder system.

Four piston and cylinder structures 10, constructed in accordance with the invention for practicing the method of the invention, are shown in a conventional nitrogen cylinder arrangement in FIG. 1.

As shown in FIG. 1, the four nitrogen cylinders 10 are secured in a manifold 12 having a passage 14 therein which is closed at one end 16 and which is connected through nitrogen line 18 to the accumulator tank 20 at the other end. The tank 20 is connected through nitrogen line 22 to the control panel 24.

The control panel 24 is provided to permit charging of the nitrogen cylinder system 26 with nitrogen, as for example from nitrogen bottle 28, and to provide a ready indication on indicator 30 of the pressure in the system 26.

Nitrogen systems, such as system 26, are useful in die operation and are well known and will therefore not be considered in further detail, except to point out that often the chamber 14 in a manifold 12 will be sufficient to permit doing away with the accumulator tank 20.

Figure 2:
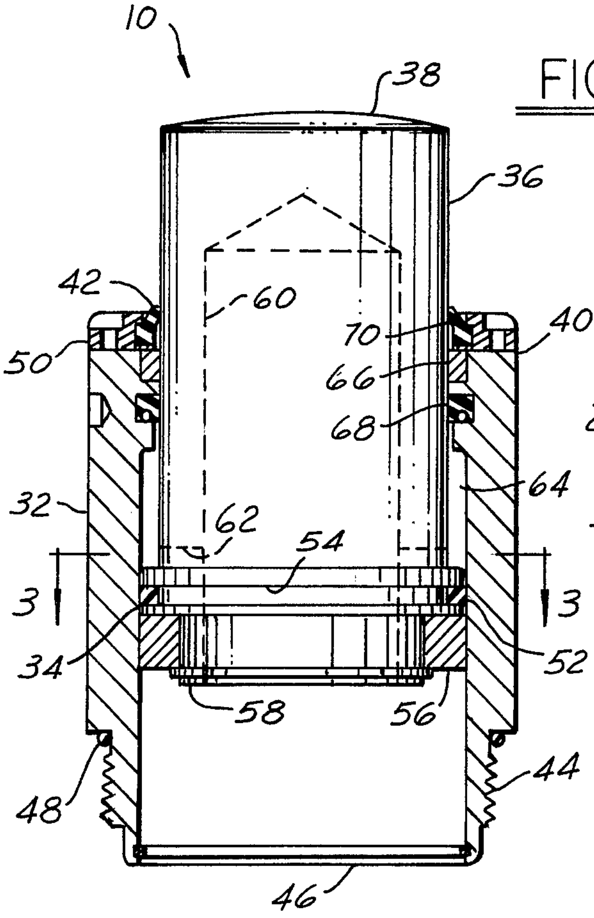
FIG. 2 is a longitudinal section view through a piston and cylinder structure constructed in accordance with the invention, as shown in FIG. 1, for practicing the method of the invention, and taken substantially on the line 2—2 in FIG. 3.
Figure 3:
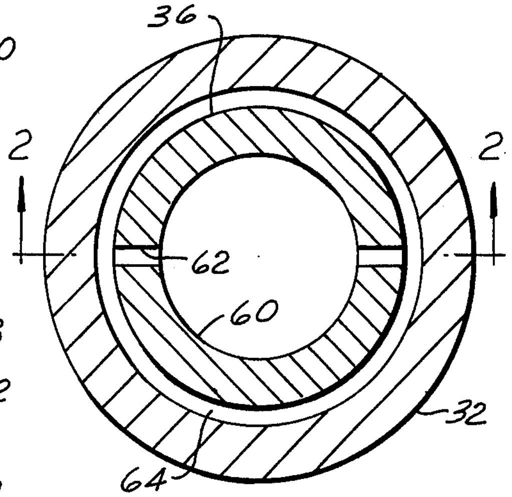
FIG. 3 is a cross section of the piston and cylinder structure shown in FIG. 2, taken substantially on the line 3—3 in FIG. 2.

The piston and cylinder structure 10 of the invention, shown best in FIG. 2, includes an outer hollow cylinder 32 and a piston 34 having a hollowed out piston rod 36 secured thereto, one end 38 of which extends out of one end 40 of the cylinder 32 as shown. The piston and cylinder structure 10 further includes the sealing means 42 operable between the end 40 of the cylinder 32 and the piston rod 36.

More specifically, the cylinder 32 has the general configuration shown and includes threads 44 on the other end 46 thereof by which the cylinder 32 may be secured to a source of actuating fluid, such as nitrogen, for example, through for example, manifold 12.

A sealing ring 48 is provided to seal and connection between the cylinder 32 and the source of actuating fluid.

An annular cap 50 is provided on the end 40 of the cylinder 32 to secure the sealing means 42 in position, as shown.

The piston 34 is shaped as shown in annular configuration and includes the lubricating means 52 in the annular groove 54 therein for lubricating the piston in its axial reciprocal movement in the cylinder 32. Piston 34 also includes a piston bearing 56 secured to the piston 34 by a retaining ring 58 or the like.

The piston rod 36 is cylindrical and hollowed out to provide the interior chamber 60 and as shown has the radially extending vent openings 62 therein extending between the chamber 60 and the space 64 defined between the cylinder 32, piston 34, piston rod 36, and sealing means 42. Piston rod 36 may be integral with or separate from but attached to piston 34.

Sealing means 42 includes the bearing 66, packing 68 and wiper 70. All of the bearing 66, packing 68 and wiper 70 are annular and are held in place by the inner configuration of the end 40 of cylinder 32 and end cap 50.

In operation of the piston and cylinder structure 10 in accordance with the invention, when the piston 34 moves down, that is, as the piston rod 38 is forced into the cylinder 32, nitrogen or other actuating fluid in the space 60 will pass through the passage 62 into the chamber 64.

Similarly, when a force on the piston rod 36 tending to force it into cylinder 32 is relieved, the pressure of the actuating medium in the cylinder 32 and therefore also in the chamber 60, will cause the piston 34 and piston rod 36 to move up, as shown in FIG. 2, to cause the piston rod 36 to extend further out of the end 40 of the cylinder 32. During extension of the piston rod 36, the space 64 is evacuated through the passages 62, into chamber 60.

Therefore, it will be seen that in accordance with the invention, the evacuation of the space 64 can be accomplished to permit rapid reciprocal movement of the piston 34 and piston rod 36 within cylinder 32 without exposing either the piston or interior of the cylinder 50 the external atmosphere so that contamination thereof is substantially prohibited.

Further, it will be noted that the non-contamination of the space 64 during actuation of the piston and cylinder structure 10 has been accomplished without external sleeves, boots, collars, and the like, and without added dimension to the cylinder, piston or piston rod.

While one embodiment of the invention has been disclosed in detail, it will be understood that other embodiments and modifications thereof are contemplated. It is the intention to include all such embodiments and modifications as are suggested by the foregoing disclosure within the scope of the invention as defined by the appended claims.

I claim:

1. Piston and cylinder structure comprising a hollow cylinder having open ends, an annular piston positioned within the cylinder for reciprocation axially thereof, a hollowed out piston rod attached to the piston at one end thereof and having a closed end extending out of the one end of the cylinder, means for sealing against admission of external atmosphere between the piston rod and the one end of the cylinder, the inner surface of the cylinder being slightly greater in diameter than the outer surface of the piston rod whereby the outer surface of the piston rod is in spaced relation to but closely adjacent the inner surface of the cylinder, said piston rod being hollowed out over most of the length thereof, and the hollowed out portion of the piston rod having a substantially greater radial extent than the non-hollowed out remaining portion of the piston rod, means for securing the other end of the cylinder to a source of gaseous actuating medium under pressure to provide the gaseous actuating medium directly to the inside of the piston rod, rigid positive stop means for limiting piston travel under said pressure, means for evacuating the space defined between the cylinder, piston, piston rod and sealing means through the piston rod without contaminating the surfaces defining said space or restricting movement of the piston and piston rod, comprising radial openings in the piston rod extending between the space and the interior of the piston rod, a manifold for gaseous actuating medium connected to the other end of the cylinder, and a control panel connected between the manifold and the source of actuating medium under pressure for providing an indication of the actuating medium as charged.

2. Structure as set forth in claim 1, and further including an accumulator tank positioned between the manifold and control panel for receiving and storing a portion of the actuating medium.

3. Structure as set forth in claim 1 wherein said actuating medium under pressure in gaseous nitrogen.

4. A plurality of piston and cylinder structures as set forth in claim 1 wherein said source of actuating medium under pressure includes a common manifold and a supplemental accumulator.

5. The structure of claim 1 wherein said source of gaseous actuating medium comprises a tank of nitrogen under pressure and includes pressure control means for regulating the nitrogen pressure supplied to said manifold, and wherein an accumulator is interposed between said nitrogen source and said manifold to supplement the volume of the manifold.

6. The structure of claim 5 including pressure control means for limiting the gaseous nitrogen pressure supplied to said manifold.

* * * * *